(12) United States Patent
Slesinski et al.

(10) Patent No.: US 12,209,647 B1
(45) Date of Patent: Jan. 28, 2025

(54) INTEGRATED INTER-AXLE DIFFERENTIAL CASE

(71) Applicant: Dana Heavy Vehicle Systems Group, LLC, Maumee, OH (US)

(72) Inventors: Steven G. Slesinski, Ann Arbor, MI (US); Aaron D. Gries, Perrysburg, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/429,147

(22) Filed: Jan. 31, 2024

(51) Int. Cl.
*F16H 48/08* (2006.01)
*F16H 48/40* (2012.01)
*F16H 48/38* (2012.01)
*F16H 48/42* (2012.01)

(52) U.S. Cl.
CPC ............. *F16H 48/40* (2013.01); *F16H 48/08* (2013.01); *F16H 2048/085* (2013.01); *F16H 2048/382* (2013.01); *F16H 2048/405* (2013.01); *F16H 48/42* (2013.01)

(58) Field of Classification Search
CPC .......... F16H 48/40; F16H 48/08; F16H 48/42; F16H 2048/085; F16H 2048/382; F16H 2048/405
See application file for complete search history.

(56) References Cited

U.S. PATENT DOCUMENTS

| | | | |
|---|---|---|---|
| 5,823,908 A * | 10/1998 | Stefanek | F16H 48/08 74/413 |
| 7,500,934 B2 | 3/2009 | Ziech | |
| 11,261,969 B2 | 3/2022 | Brock et al. | |
| 11,698,123 B1 * | 7/2023 | Singaran | F16H 57/0457 475/220 |
| 2021/0048094 A1* | 2/2021 | Andres | F16H 57/037 |
| 2022/0028776 A1 | 1/2022 | Huang | |

FOREIGN PATENT DOCUMENTS

| | | | | |
|---|---|---|---|---|
| GB | 190914547 A | * | 6/1910 | |
| RU | 2577417 C2 | * | 3/2016 | B60K 17/36 |

* cited by examiner

*Primary Examiner* — Justin Holmes
(74) *Attorney, Agent, or Firm* — McCoy Russell LLP

(57) ABSTRACT

Systems and methods are provided for an inter-axle differential assembly. The inter-axle differential assembly comprises a case and a spider disposed within the case which includes a plurality of outwardly extending leg which includes a indent positioned at a distal face. The case comprises a plurality of protrusions adapted to be positioned within the corresponding indents of the plurality of outwardly extending legs, the plurality of protrusions adapted to maintain a position of the case relative to the spider.

19 Claims, 11 Drawing Sheets

INTEGRATED INTER-AXLE DIFFERENTIAL CASE

TECHNICAL FIELD

The present description relates generally to systems and methods for integrating a means of attaching a differential spider of an inter-axle differential assembly to a case of the inter-axle differential assembly into the case.

BACKGROUND AND SUMMARY

Some vehicles may employ an inter-axle differential (IAD) assembly which may allow speed differentiation between multiple axles, such as tandem rear axles. The IAD assembly may include a gear system adapted to distribute torque between the axles. The gear system may be positioned within and surrounded by a case. As one example the gear assembly may include a spider including a plurality of legs, the plurality of legs adapted to support a plurality of side pinon gears. It is advantageous to secure the spider to the case to ensure correct alignment of the case with respect to adjacent gears and reduce undesired rubbing against the adjacent gears which may prematurely degrade said adjacent gears. In some examples, additional hardware such as fasteners, clips, rings, or rivets may be used to couple the plurality of legs of the spider to the case. The additional hardware may increase a cost and weight of the IAD assembly and attaching each fastener may be a time consuming process.

The inventors have herein devised a solution to at least partially address the above problem. In one embodiment, an inter-axle differential assembly comprises a case and a spider disposed within the case, the spider having a plurality of outwardly extending legs, each leg comprising an indent at a distal end thereof, wherein the case comprises a plurality of protrusions adapted to be positioned within corresponding indents of the plurality of outwardly extending legs, the protrusions adapted to maintain a position of the case relative to the spider.

In one example, the protrusions secure a positon of the spider relative to the case without demanding additional fasteners, clips, rings or rivets. Such additional fasteners add to a cost and weight of the IAD assembly as well as demanding increased time for assembly. The protrusions may be formed by punching, which may be performed faster than joining fasteners.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
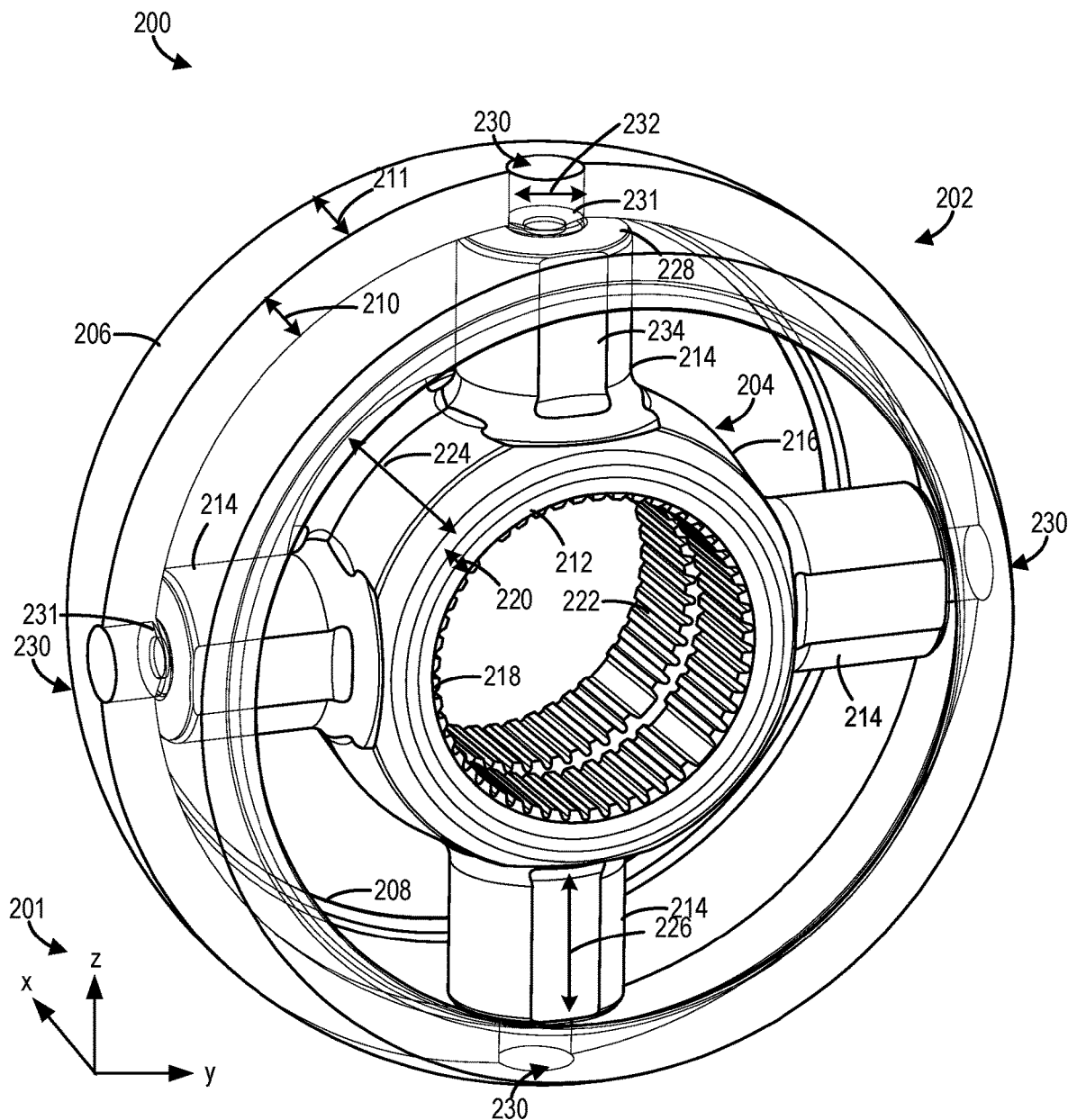
FIG. 2 shows a partial cross section view of a IAD assembly including case with protrusions and a spider.
Figure 3:
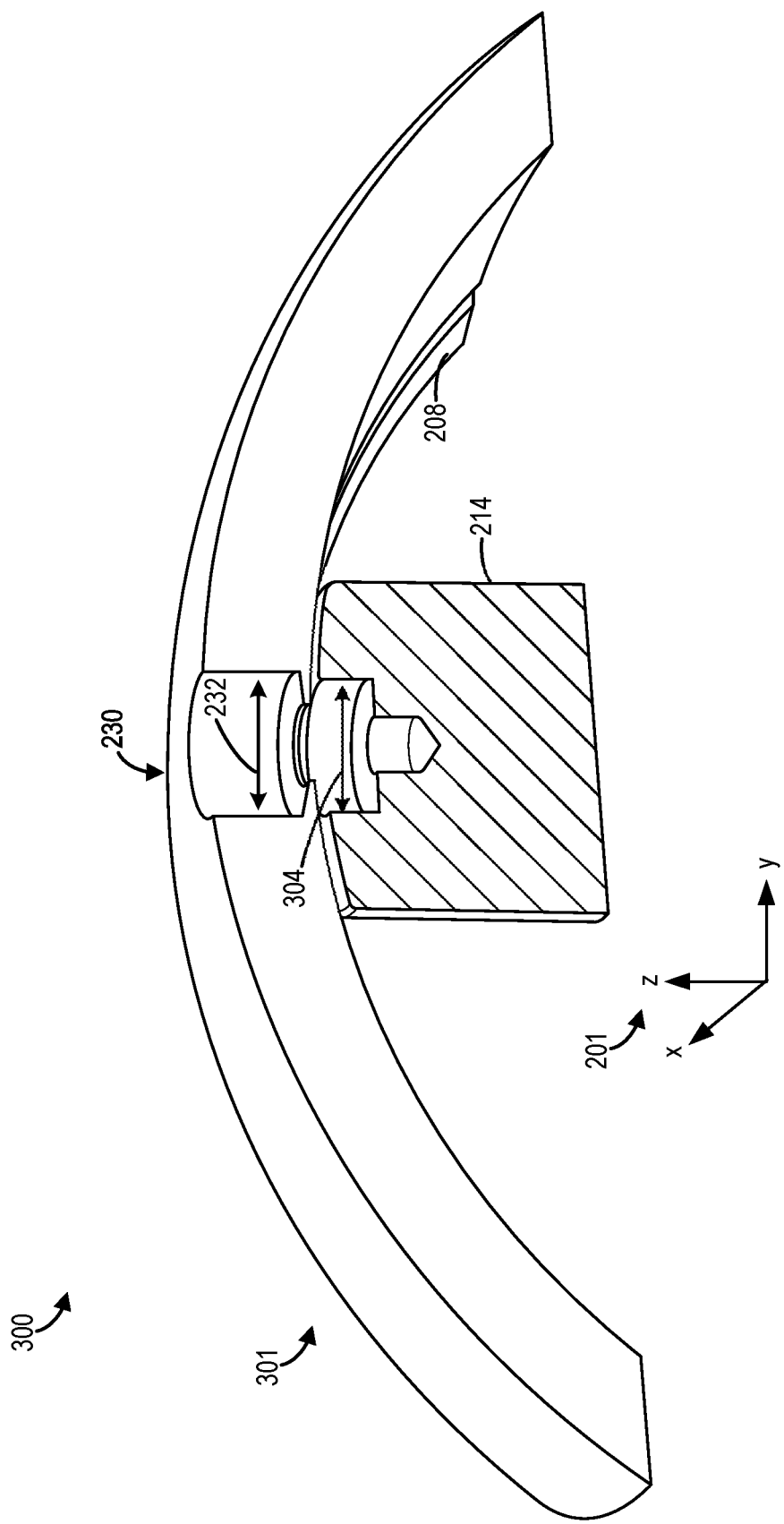
FIG. 3 shows a cross section view of the case and the spider.
Figure 4:
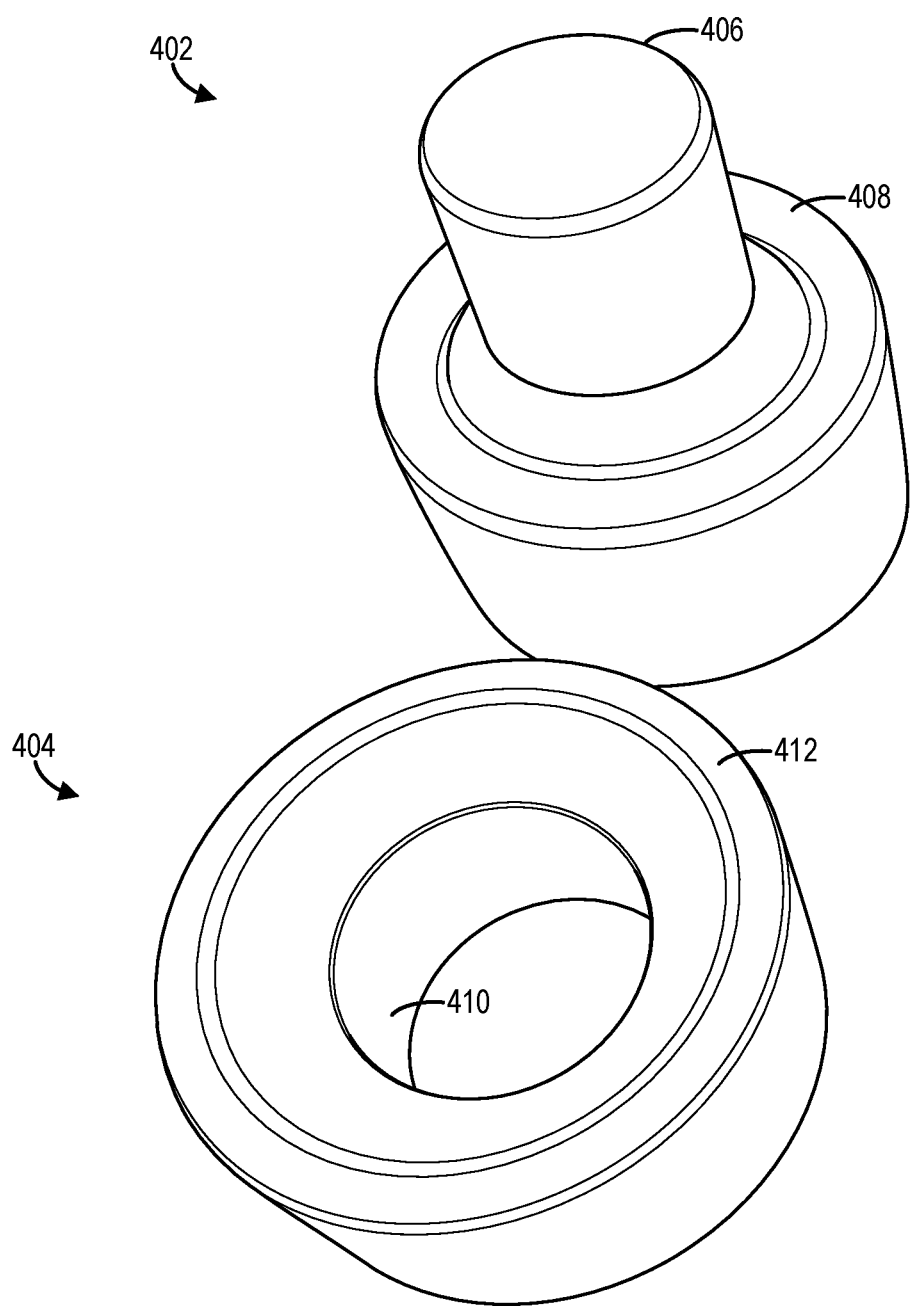
FIG. 4 shows an example of a punch a die which may model attachment of a spider leg to the case.
Figure 5:
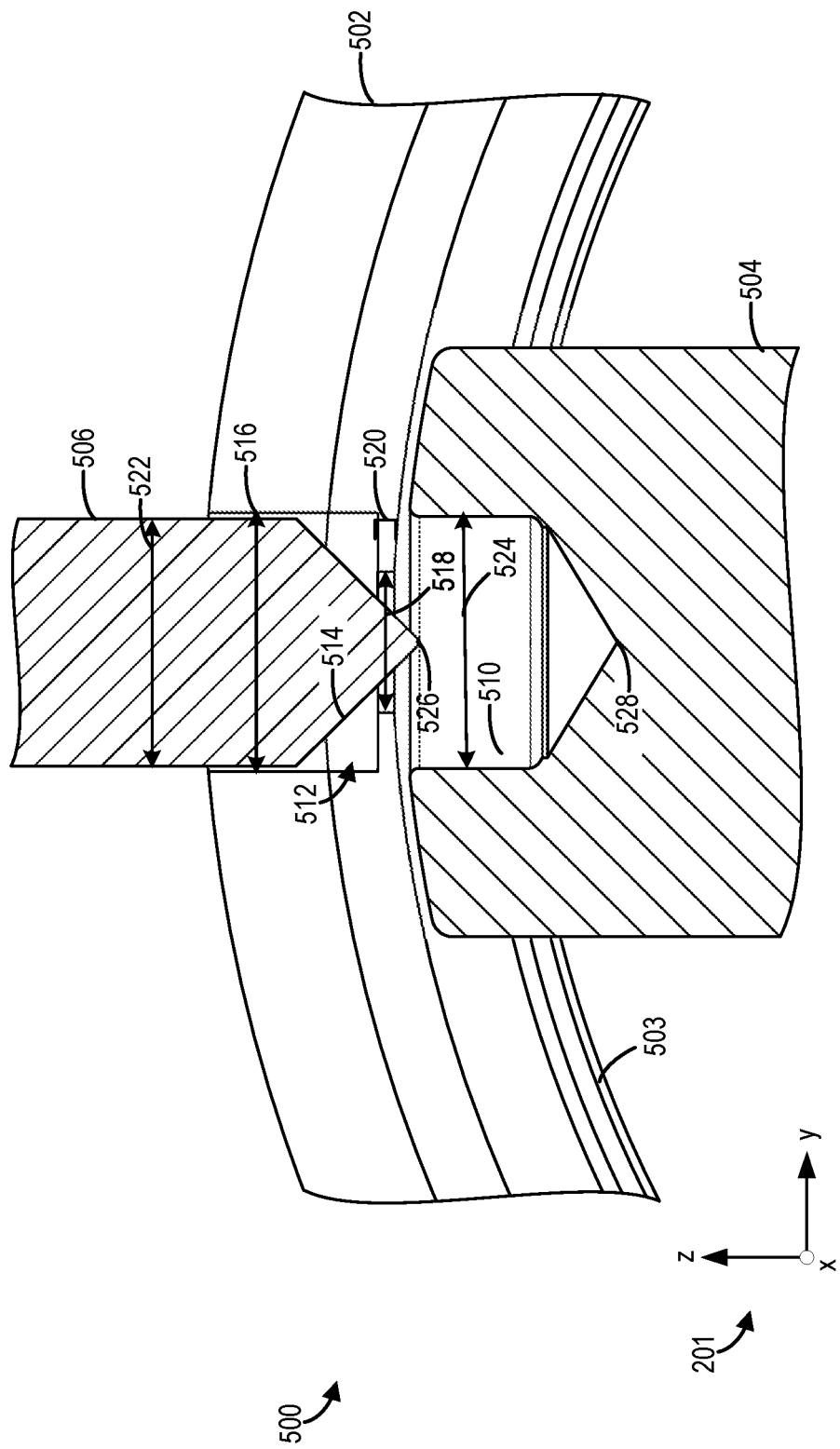
FIG. 5 shows a first cross section view of a punch and corresponding case and spider leg.
Figure 6:
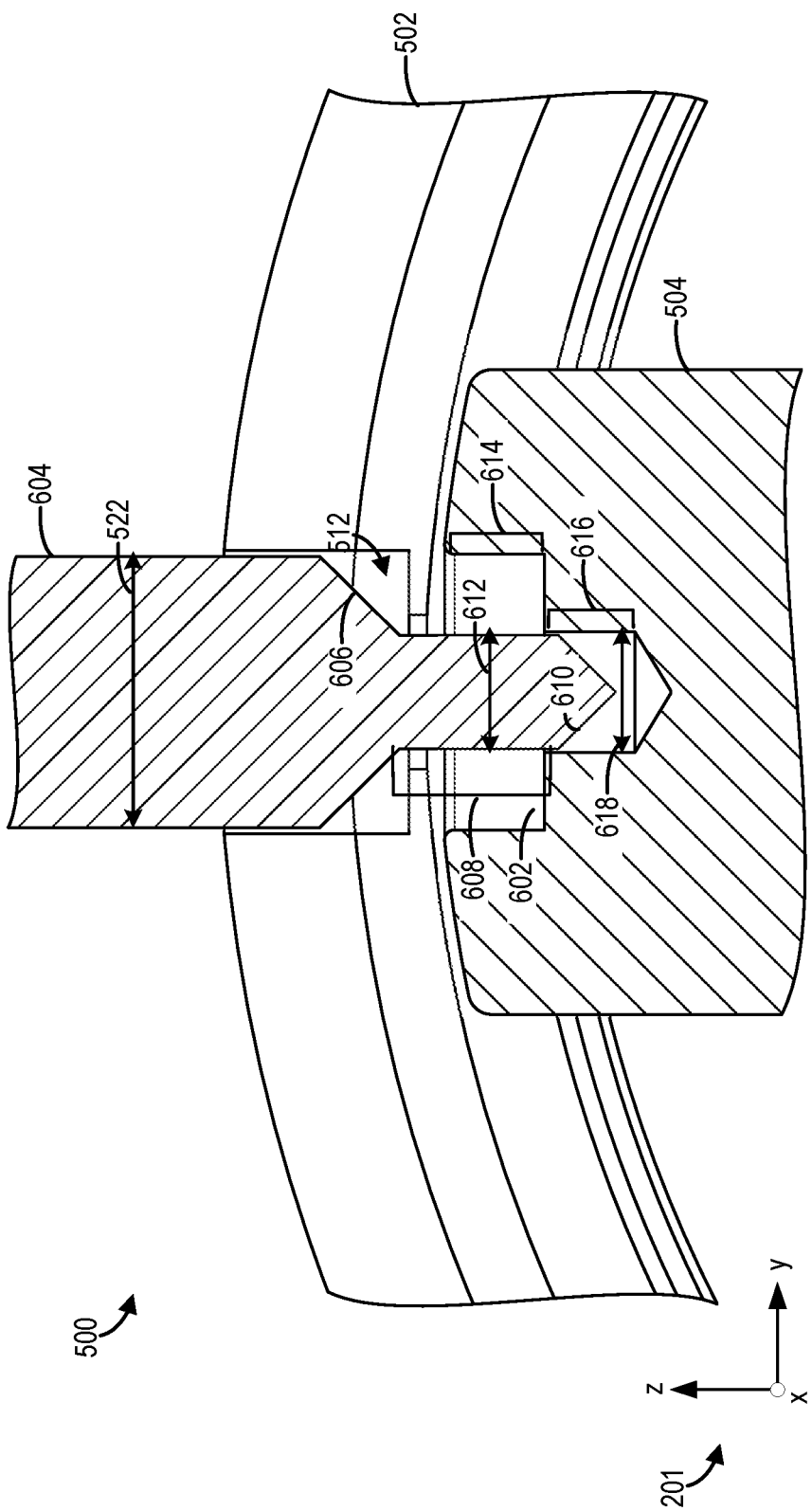
FIG. 6 shows a second cross section view of a punch and corresponding case and spider leg.
Figure 7:
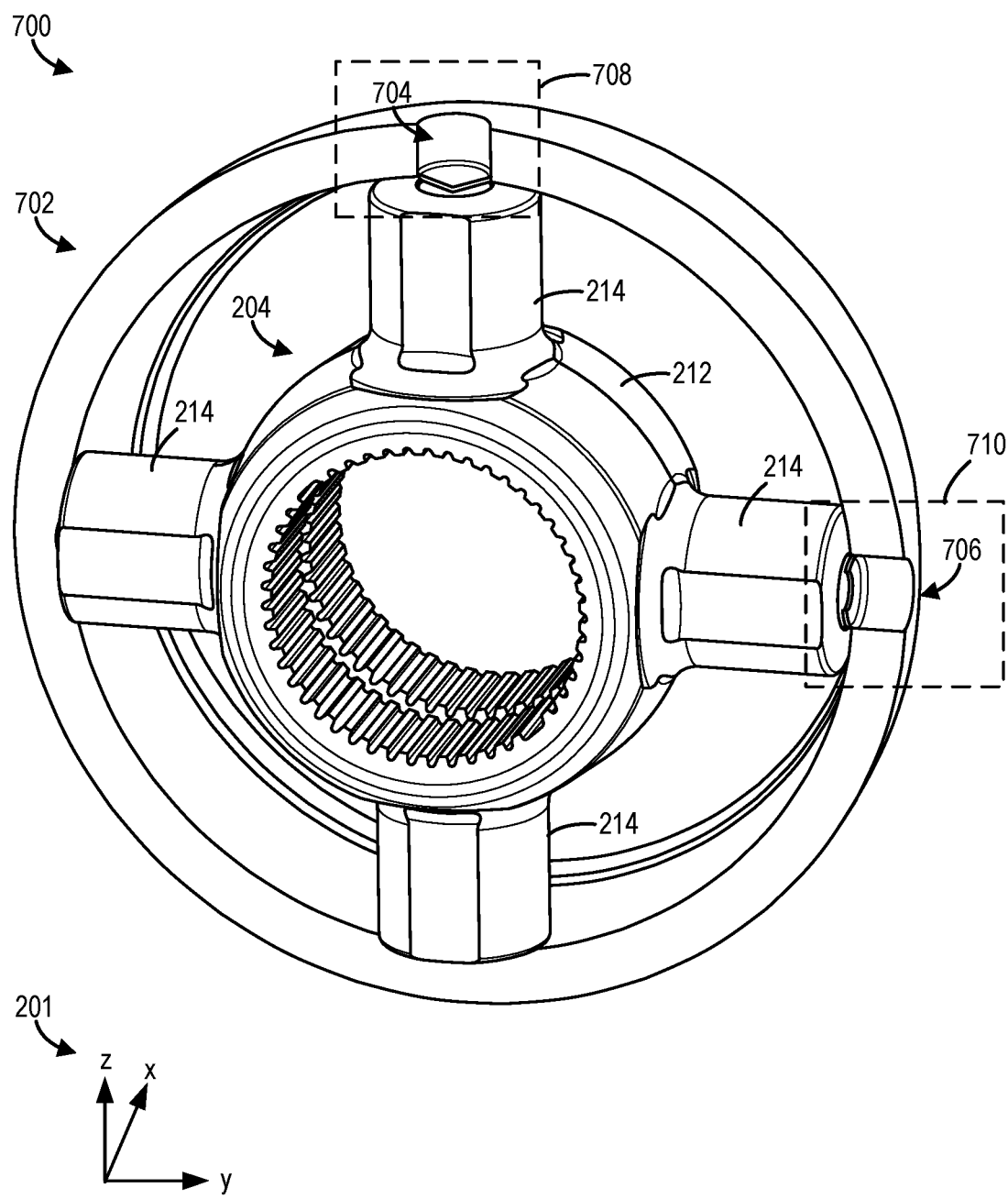
FIG. 7 shows a partial cross section view of a case include a protrusion with a pilot hole and a protrusion without a pilot hole.
Figure 8:
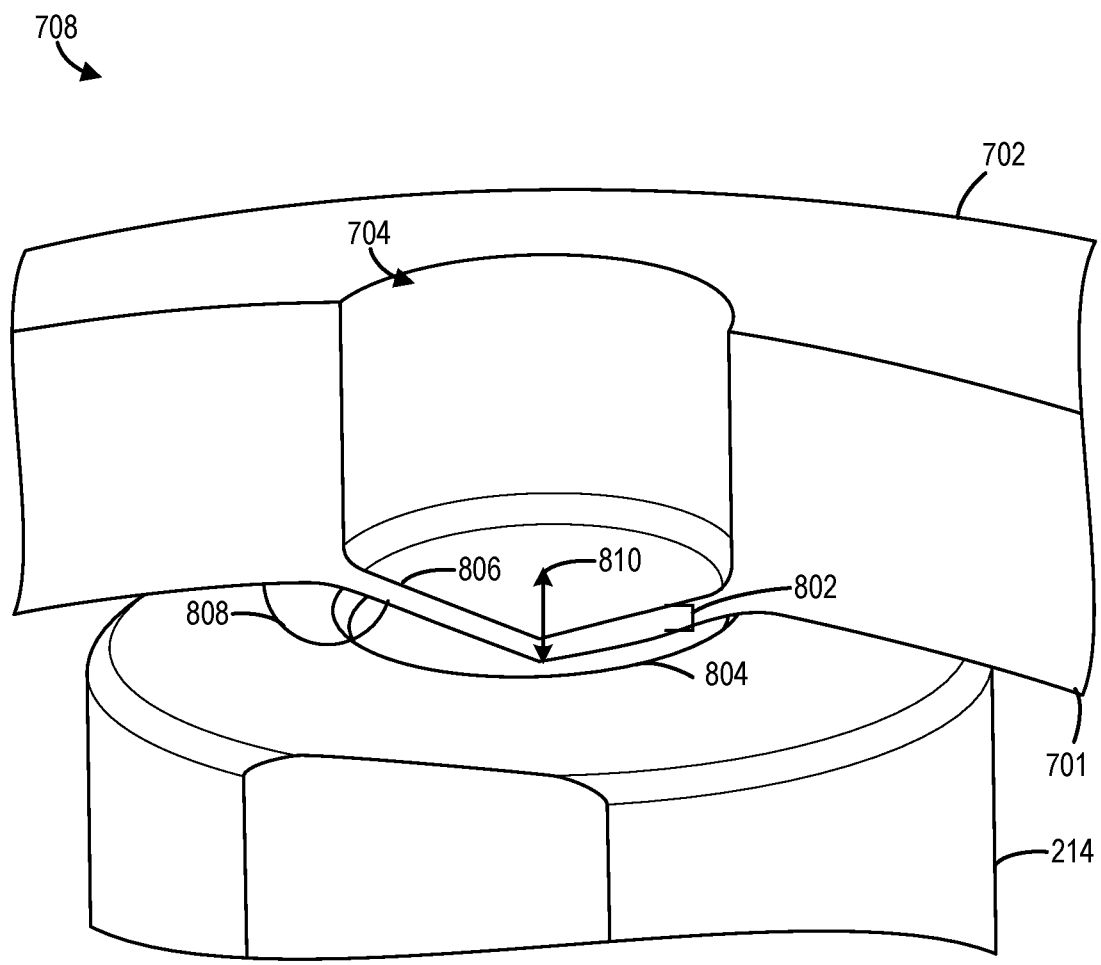
FIG. 8 shows a close view of a first portion of the deformable case and spider of FIG. 7.
Figure 9:
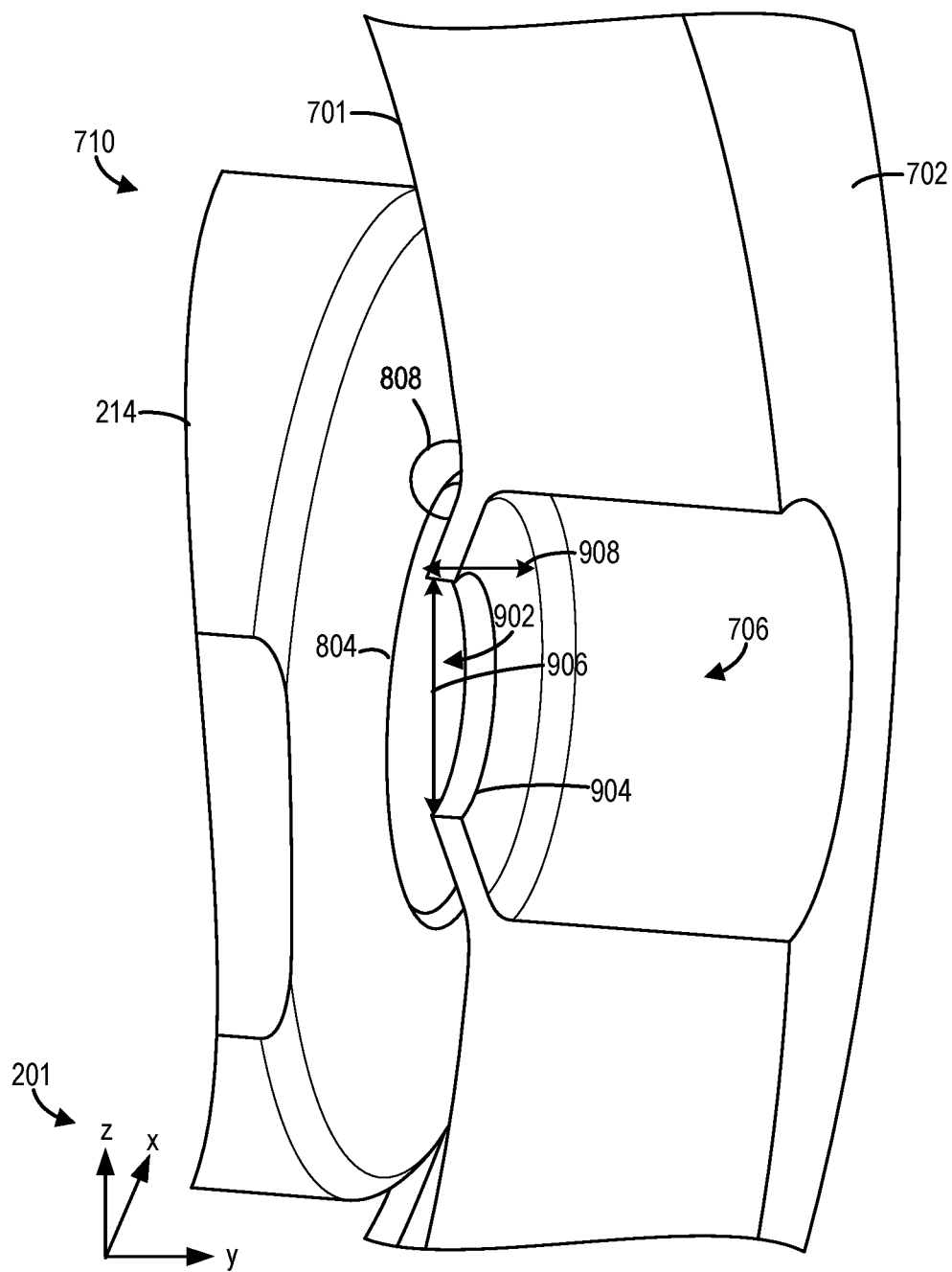
FIG. 9 shows a second close view of a second portion of the deformable case and spider of FIG. 7.
Figure 10:
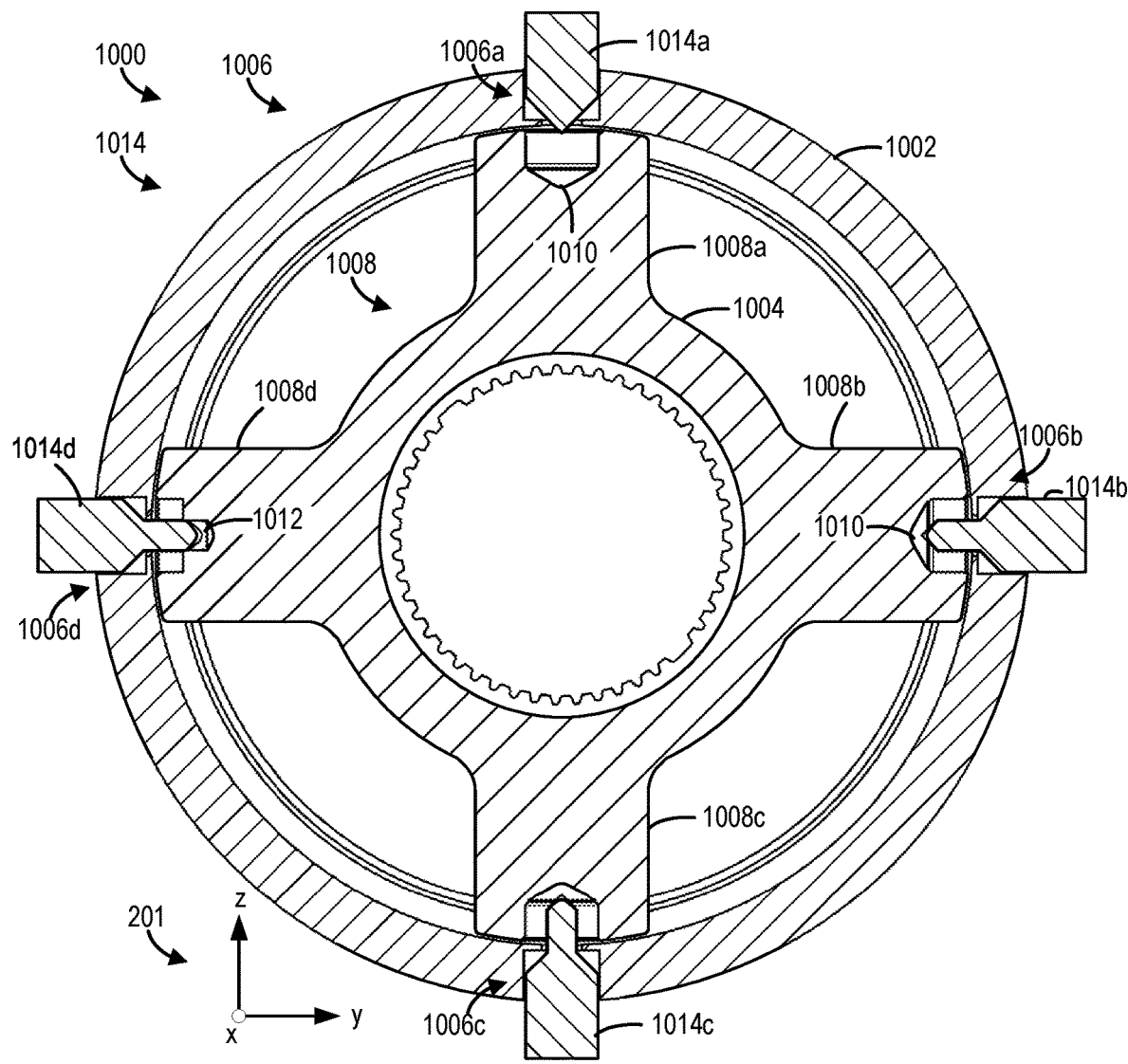
FIG. 10 shows a cross section view of a case and spider of an IAD pre-assembly in addition to punches.
Figure 11:
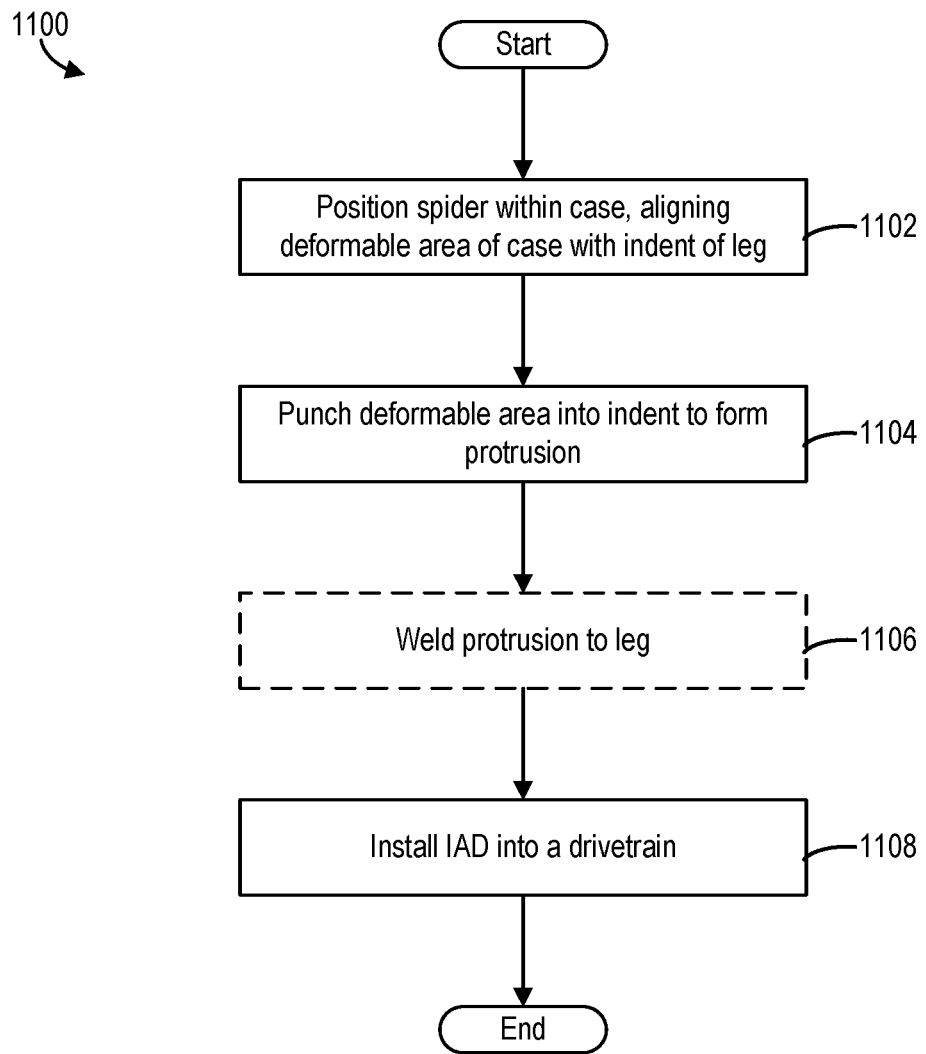
FIG. 11 shows an example of a method of attaching a spider of an IAD assembly to a case of the IAD assembly according to an embodiment.

The following disclosure relates to systems and methods for integrating attachments of a spider of an inter-axle differential (IAD) assembly to a case of the IAD assembly into the case. The IAD assembly may be included in a vehicle, such as the vehicle shown schematically in FIG. 1. The IAD assembly may include a case and a spider. Legs of the spider may be in face sharing contact with an inner surface of the case as shown in the view of FIG. 2, and fixedly coupling the legs of the spider to the inner surface of the case may help reduce, and even prevent, undesired movement of the case relative to the spider and other components of the IAD assembly and adjacent drivetrain components. In one example, the case may be coupled to the spider legs by a protrusion feature integrated into the case. In this way the case is coupled without the use of fasteners or other additional components. FIG. 3 shows a cross section of the case and one spider leg. The case may be machined to include a deformable area adapted to be deformed into a protrusion where the case is in face sharing contact with the spider leg. The corresponding portion of the one spider leg may be machined to receive the protrusion of the case. In one example, deforming the case to form the protrusion may be performed by a punch, such as a punch of a punch and die set as shown in FIG. 4. Examples of a configuration of punch, case and spider leg is shown in FIGS. 5-6. In some examples, the deformable portion and resulting protrusion may or may not include a pilot feature as shown in FIGS. 7-9. Further the case may include protrusions at two adjacent arms of the spider as shown in FIG. 7 or at each arm of the spider as shown in FIG. 10. An example of a method for attaching a case with deformable portions to legs of a spider is shown in FIG. 11.

Figure 1:
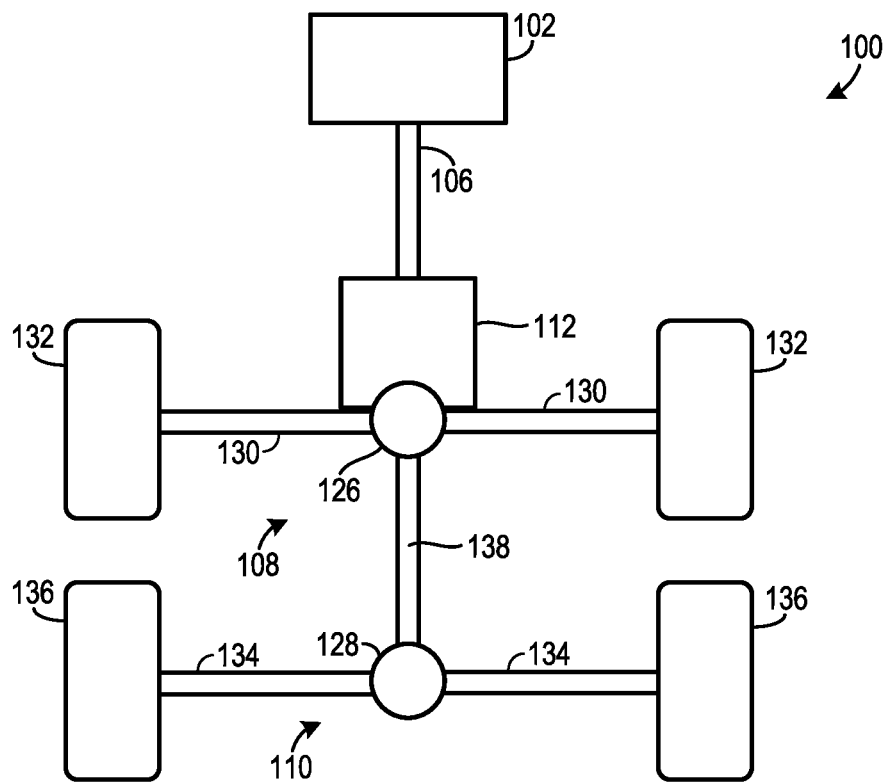
FIG. 1 shows a schematic representation of a vehicle system including an inter-axle differential (IAD) assembly coupled to multiple drive axles.

Turning now to FIG. 1, it shows a schematic diagram of a vehicle 100. The vehicle 100 may comprise a drive device 102 which may generate rotational output such as an internal combustion and/or an electric motor. The internal combustion engine may include cylinder(s), piston(s), valves, a fuel delivery system, an intake system, an exhaust system, etc. and the electric motor may include a rotor, stator, housing, a shaft, and electrical connections between it and an energy storage device. The vehicle may take a variety of forms such as a light, a medium, or a heavy duty vehicle. Furthermore, hybrid and battery electric vehicles have been envisioned. In other examples, the vehicle may solely use an internal combustion engine or an electric motor for motive power generation.

The diagram of FIG. 1 provides a higher-level topology of the vehicle, drivetrain, and corresponding components. Nevertheless, the vehicle, drivetrain, and corresponding components may have greater structural complexity than is captured in FIG. 1. The structural details of a case and spider of an IAD of the vehicle system 100 are described in greater detail herein with regards to FIGS. 2-3 and 5-10.

The vehicle 100 includes an IAD assembly 112. The drive device 102 may couple to IAD assembly 112 via a shaft 106 or other suitable mechanical components. The IAD assembly 112 may couple to the first and second axles 108, 110. In some examples, the IAD assembly 112 may be positioned between the device drive 102 and the first axle 108. In alternate embodiments, the IAD assembly 112 may be positioned between the first axle 108 and the second axle 110. Other positions of the IAD 112 within vehicle 100 are also considered. The axle coupling may be accomplished via shafts and/or gears, for instance. Thus, the IAD 112 may include a first rotational output (e.g., drive shaft coupled to one of the axle differential) and a second rotational output (e.g., a gear coupled to a carrier of the other axle differential). Unlocking and locking the IAD may therefore permit and inhibit speed differentiation between these two rotational outputs.

The first and second axles 108, 110, in turn may include a first and a second axle differential 126, 128, respectively. The first and second axle differentials 126, 128 may enable speed differentiation between drive wheels of the corresponding axle under certain conditions. In some implementations, the axle differentials may be locking differentials adapted to inhibit and permit wheel speed differentiation at different times. However, a variety of suitable types of axle differential may be deployed in the vehicle. The first and second axles 108, 110 may be in a tandem axle arrangement spaced away from non-driving steerable axle (e.g., non-driving front axle). In another example, the first axle 108 may be a front axle and the second axle 110 may be a rear axle.

The first axle 108 may include axle shafts 130 coupled to drive wheels 132. The second axle 110 likewise may include axle shafts 134 and drive wheels 136. The vehicle system 100 may include a shaft 138 which extends between the IAD 112 and the second axle 110.

An IAD assembly, such as the IAD assembly 112 of FIG. 1 may include a case circumferentially surrounding a spider with a plurality of legs. Each of the plurality of legs of the spider may support a pinion gear. The pinion gears may engage with adjacent components of the IAD assembly, such as output side gears. If the spider and associated pinion gears are not affixed in place within the case, the case may become unaligned, and cause premature degradation of the neighboring components, such as the output side gears. Fasteners or other additional components may be used to secure the spider to the case, but their addition increases a cost and weight of the IAD assembly and increases a time demanded for assembling the IAD assembly. Instead of fasteners, a means of attaching the case to the spider may be integrally formed into the case. Specifically, the case may be deformed into protrusions adapted to fixedly couple the case to one or more of the plurality of spider legs. In this way, the case is prevented from moving relative to the spider and the spider may be retained within the case by the protrusions without increasing a weight of the IAD assembly. Further, the coupling may be performed efficiently by automated machinery.

An example of a portion of an IAD assembly 200 is shown including a case 202 and a spider 204. A reference axis 201 is provided for comparison between the views of FIGS. 2-3 and 5-10. Reference axis 201 includes an x-axis, y-axis, and z-axis. An axial direction with respect to case 202 is parallel with the x-axis. Radial axes with respect to case 202 may be parallel with the z-axis and y-axis.

Case 202 may be an annular shape, circumferentially surrounding spider 204. Case 202 may include an outer circumferential surface 206 and an inner circumferential surface 208. A distance between inner circumferential surface 208 and outer circumferential surface 206 may define a radial thickness 210 of case 202. Case 202 max may be an axial thickness corresponding to twice the distance indicated by arrow 211.

Spider 204 may include a ring portion 212 and outwardly extending legs 214. Ring portion 212 may be positioned concentrically within case 202 and include an outer circumferential surface 216 and an inner circumferential surface 218. Inner circumferential surface 218 and outer circumferential surface 216 may be separated by a distance 220 defining a radial thickness of the ring portion 212. In one example, inner circumferential surface 218 may include splines 222 adapted to engage with an input shaft, such as shaft 106 of FIG. 1. The splines 222 may be oriented axially with respect to ring portion 212 and radially with respect to a circumference of legs 214. Further, ring portion 212 may be an axial thickness indicated by arrow 224. In one example, and axial thickness of ring portion 212 may be less than an axial thickness of case 202.

Legs 214 may protrude radially from outer circumferential surface 216 of ring portion 212. In one example, spider 204 may include four legs evenly spaced around a circumference of ring portion 212. In alternate embodiments, spider 204 may include three legs. Legs 214 may be shaped as cylinders, having a body with a length indicated by arrow 226, a proximate face of legs 214 may be integrally formed with outer circumferential surface 216 of ring portion 212 and a distal face 228 in face sharing contact with inner circumferential surface 208 of case 202. The cylindrical body of each of legs 214 may include two rectangular faces 234. Rectangular faces 234 may extend axially with respect to the cylindrical body of legs 214. The two rectangular faces 234 may each be positioned 1800 from each other around the cylindrical body. The two rectangular faces may be positioned facing axial faces of ring portion 212 and of case 202. IAD assembly 200 may further include pinion gears circumferentially surrounding each leg 214, not shown herein for clarity.

Case 202 may further include one or more deformable areas 230. Positions of the one or more deformable areas 230 correspond with positions of legs 214. In an exemplary embodiment, deformable areas may be circular, having a circular cross section in a radial direction with a diameter 232. Diameter 232 may be parallel to a diameter of distal face 228 and normal to a diameter of case 202. Diameter 232 may be less than a diameter of distal face 228 of leg 214. A radial thickness of case 202 in deformable area 230 may be less than a radial thickness 210 in areas of case 202 that do not comprise a protrusion. Protrusions may not be present in areas of case 202 that are spaced away from legs 214 and not axially and radially in line with distal face 228 of leg 214. In one example, deformable areas 230 may be integrally formed and continuous with case 202 and be made of the same material as case 202. Because deformable area 230 is continuous with case 202, deformable area may not include a bolt, joint, fastener or any other additional components at an interface of deformable area 230 with the remainder (e.g., non-deformable areas) of case 202. In this way, deformable areas 230 may be deformable based on their decreased thickness creating an area that is deformable by a punch and not a difference in material forming the deformable areas. Further, the deformable areas 230 may be an area of the case that is more deformable than remaining areas of the case that do not include a protrusion. As one example, case 202 may be formed of a metal. For example, case 202 may be formed of aluminum, steel, or materials of suitable strength and/or durability. In alternate examples, the deformable area 230 may be formed of a different material from the case 202, the material of the deformable area 230 having a lower modulus of plastic deformation than the surround case 202. The deformable area 230 may be deformable by force of a punch pressing against deformable area 230. Deformable area 230 may be axially positioned equidistant from axial ends of case 202. In this way, when legs 214 are axially aligned with deformable areas 230 spider 204 is axially centered with respect to case 202. In an assembled case, deformable area may be formed into a protrusion 231. Protrusion 231 may extend continuously from inner circumferential surface 208 at an angle into an indent of legs 214. In this way protrusion 231 may be mated to the indent even though walls of the indent are smooth and no fasteners are used. The deformable area may be deformable enough to form protrusion 231 by punching, but stiff enough that a shape of the protrusion is maintained when the punch is removed and the protrusion is not further deformed during installation of the IAD assembly with a drive train or during operation of a vehicle including the IAD assembly. Features of protrusions such as protrusion 231 are describe further below with respect to FIGS. 8 and 9.

Turning now to FIG. 3 it shows a cross section view of IAD pre-assembly 300. IAD pre-assembly 300 may correspond to IAD assembly 200 before deformable areas are formed into protrusions. The cross section view shows both pre-assembly case 301 and leg 214 are shown. Pre-assembly case 301 may be similar to case 202 of the IAD assembly 200 before deformable areas are formed into protrusions.

The cross section of leg 214 shows an indent 302 formed in distal face 228 of leg 214. Indent 302 may be aligned in an axial and radial direction with deformable area 230. In some embodiments a first circular portion of indent 302 may have a circular cross section with respect to a radial direction (e.g., in the x-y plane) of leg 214. The first circular portion may extend inward from at the distal face of leg 214. As one example, a diameter 232 of deformable areas 230 may be substantially (e.g., within 5%) the same as a diameter 304 of the first circular portion of indent 302 radially closest to deformable area 230. In alternate examples, the diameter 232 of the deformable area 230 may be at least equivalent to diameter 304. Indent 302 may not include threading or other protruding or indented features adapted to engage a fastener, for example walls of indent 302 may be smooth. Deforming deformable area 230 as described below may secure spider 204 to case 202 without the use of fasteners such as screws which demand threading. Deformable area 230 of IAD pre-assembly 300 may be in line with and follow a contour of inner circumferential surface 208 and an inner diameter of case 301 of IAD pre-assembly 300 may be uniform. Inner circumferential surface 208 may not include protrusions or idents prior to punching deformable areas 230. Deformable area 230 may or may not include a pilot hole. In examples where deformable area 230 does not include a pilot hole, inner circumferential surface 208 of case 301 of IAD pre-assembly 300 may be a continuous. As described further below, case 202 may be affixed to leg 214 by deforming deformable area 230 to form a protrusion, the protruded deformable area (e.g., the protrusion) extending an angle from inner circumferential surface 208 towards an indent of leg 214 (e.g., towards an interior of case 301). The protrusion may be adapted to mate with indent 302. In this way, case 202 may be prevented from moving in an axial or radial direction with respect to spider 204. The process of deforming deformable area 230 may be a punching process. The punching process may be similar to a punching process performed using a punch and die block as shown in FIG. 4.

Turning now to FIG. 4, it shows an example of a punch 402 and die block 404. Punch 402 may include a pilot portion 406 and a punch face 408. Pilot portion 406 may extrude perpendicularly from punch face 408. Die block 404 may include a bore area 410 and a blocking face 412. When punching, the pilot portion 406 may position in line with bore are 410 and a material to be punched may be positioned therebetween. The pilot portion 406 may press on the material being punched forcing the area being punched at least partially through bore area 410, thereby deforming the material. Motion of punch 402 may be arrested when punch face 408 is stopped by blocking face 412.

In the example shown in FIG. 2, indent 302 may serve as a die block such as die block 404 and may be adapted to receive a punch such as punch 402. A punch may deform a deformable area, such as deformable area 230, from being in line with an inner circumferential surface of a case to being positioned at an angle inward towards walls of indent 302. When the punch is removed, the deformable area may remain in a deformed shape, thereby preventing movement the leg relative to the case. For this reason, a shape of an indent of a leg may be formed to be complementary to a shape of a punch used to deform the corresponding deformable area. The shape of the indent may be adapted to receive a pilot portion of a punch.

A cross-section of an example of a portion of a first embodiment of an IAD pre-assembly 500 and a punch 506 is shown in FIG. 5. More specifically, FIG. 5 shows a pilot portion of the punch 506. IAD pre-assembly 500 may include a case 502 and a spider including a leg 504. Case 502 and leg 504 may be similar to case 301 and leg 214 of FIGS. 2-3, respectively. Case 502 may further include a deformable area 512 which may be similar to deformable area 230 of FIG. 2. Deformable area 512 may be shaped as a ring having an outer diameter 516 and an inner diameter 518 defining a hole which may receive a point of a conical punch face 514 of punch 506. Additionally, deformable area 512 may be a thickness 520 in a radial direction. As one example inner diameter 518 may be at most a percentage of outer diameter 516. The hole of deformable area 512 may be a pilot hole, adapted to help decrease a resistance of deformable area 512 against punch 506 while still providing a desired resistance to relative movement of case 502 and leg 504 when deformed to be a protrusion extending into indent 510. Additionally, a maximum diameter 522 of punch 506 may be a marginal amount smaller than outer diameter 516. In this way, punch 506 may be maintained in alignment in the x-y plane while still moving freely in a radial direction to perform the punching operation.

Indent 510 may be similar to indent 302 of FIG. 3 and may be adapted to receive punch 506 during the punching action. In this way, indent 510 may act as a die block to punch 506. For this reason, indent 510 may be shaped complimentary to (e.g., as a negative of) punch 506. A maximum diameter 524 of indent 510 may be marginally larger than the diameter 522 of punch 506. In one example, maximum diameter 524 may be equivalent to outer diameter 516 of deformable area 512. When in punching occurs, a conical point 526 of punch 506 may come into face sharing contact with a point 528 of indent 510. Further, deformable area 512 may be deformed to protrude at an angle from inner circumferential surface 503 of case 502 and be positioned within indent 510.

Turning now to FIG. 6, it shows an alternate embodiment of an IAD pre-assembly 500. Leg 504 of IAD pre-assembly 500 may include a stepped indent 602. Stepped indent 602 may be adapted to receive punch 604. FIG. 6 shows a pilot portion of punch 604. Punch 604 may include a first tapered face 606, a centering portion 608, and a second tapered face 610. First tapered face 606 may transition punch 604 from diameter 522 to a diameter 612 of centering portion 608. Second tapered face 610 may be conically shaped and taper to an end point.

Indent 602 may include a first portion 614 and a second portion 616. First portion 614 may be a diameter corresponding to diameter 522. A diameter 618 of second portion 616 may be smaller than diameter 522 of first portion 614. Indent 602 may be oriented with first portion 614 closer to case 602 than second portion 616. First portion 614 may abruptly transition to second portion 616 forming a step transition between the two. Diameter 618 may be marginally larger than diameter 612 of centering portion 608. An end of second portion 616 furthest from first portion 614 may be conically shaped and adapted to receive second tapered face 610. In this way second portion 616 may receive centering portion 608 and first portion 614 may be adapted to mate with the protrusion formed by deformable area 512. In this way, punch 604 may be centered with respect to deformable area 512 before continuing to move along the z-axis towards leg 504 to place the conical end of punch 604 in face sharing contact with the conical bottom of second portion 616, and forcing deformable area 512 to protrude at an angle away from inner circumferential surface 503 and into first portion 614 of indent 602 by action of first tapered face 606 against deformable area 512.

Turning now to FIG. 7, it shows a IAD assembly 700 showing a spider 204 and a case 702 shown in cross section. Spider 204 may be the same as spider 204 of FIG. 2. Case 702 may be similar to case 202 of FIG. 2. Components of case 702 and spider 204 that correspond to parts of FIG. 2 are numbered the same and are not reintroduced. Case 702 includes a first deformable area 704 and second deformable area 706. In some examples, a quantity of legs of spider 204 may be greater than a quantity of the deformable areas. For example, spider 204 may include four spider legs and case 702 may include two deformable areas. The two deformable areas may be positioned in face sharing contact with legs that are spaced 90° from each other around ring portion 212. A first deformable area may be spaced axially 90° (e.g., with respect to the x-axis) from a second deformable area around circumference of case 202. In some examples, the spider may include three legs and the two deformable areas may be each be positioned in face sharing contact with two legs that are adjacent to each other around the outer circumferential surface of ring portion 212.

As one example, a first deformable area 704 may be formed without a pilot hole and a second deformable area 706 may be formed with a pilot hole. In alternate examples all deformable areas of a case such as case 702 may be formed the same, either all with or all without a pilot hole. Features of first deformable area 704 are shown in more detail in FIG. 8 which shows a section of IAD assembly 700 outlined by box 708. Feature of second deformable area 706 are shown in more detail in FIG. 9 which shows a section of IAD assembly 700 outline by box 710.

Turning now to FIG. 8, it shows cross sectional view of case 702 and first deformable area 704. Deformable area 704 may be positioned radially directly adjacent to indent 804 of leg 214. First deformable area 704 may be formed as a circular disc. First deformable area may not include a pilot hole. First deformable area 704 may be deformed into protrusion 806 which extends at an angle 808 from the inner circumferential surface towards leg 214. As one example, angle 808 may be greater than 90° and less than 180°. As a further example angle 808 may be in a range of 140° to 160°. Protrusion 806 may be conically shaped, having sides uniformly tapering to a point. The point and sloped sides of protrusion 806 may be positioned within indent 804. The point of protrusion 806 may be displaced from the inner circumferential surface 701 of case 702 by a distance 810

Turning now to FIG. 9, it shows a partial cut out of second deformable area 706. Second deformable area 706 may include a protrusion 904, the protrusion including a pilot hole 902. With pilot hole 902, second deformable area 706 may have a ring or annular shape. Protrusion 904 may include sides tapering towards an interior of indent 804 extending at an angle 808 from the inner circumferential surface of case 702. A radial thickness of second deformable area 706 may be similar to the radial thickness 802 of first deformable area 704. In this way, second deformable area 706 may be similar to deformable area 512 described above with respect to FIGS. 5 and 6 above. Pilot hole 902 may have a diameter 906 positioned parallel to diameter of deformable area 706 and may be adapted to pass a conical point of a punch. In some examples, diameter 906 of pilot hole 902 may be smaller than a diameter of the punch, such as punch 504 or punch 604. In some examples, a punch may include a centering portion and diameter 906 may be larger than the diameter of the centering portion of the punch and smaller than the punch largest diameter of the punch. Protrusion 904 may include a circumferential edge of pilot hole 902 extending a distance 908 into indent 804. Including the pilot hole may help guide a punch to a center of deformable area 706 and may help decrease a force demanded to deform the deformable area. In this way, the deformable area may be evenly deformed into the corresponding indent of leg 214. On the other hand, including the pilot hole may increase a number of steps demanded for manufacturing a case, such as case 702.

Turning now to FIG. 10, it shows a cross section of a view of an embodiment of an IAD pre-assembly 1000 including a case 1002 circumferentially surrounding a spider 1004. IAD pre-assembly 1000 may exemplify an embodiment wherein a quantity of deformable areas is equivalent to a quantity of legs of the spider. Case 1002 may be similar to case 301 of FIG. 3 and spider 1004 may be similar to spider 204 of FIGS. 2 and 3. Case 1002 may include four deformable areas 1006, including a first deformable area 1006a, a second deformable area 1006b, a third deformable area 1006c and a fourth deformable area 1006d. Each deformable area 1006 may be radially and axially aligned with a leg 1008 of spider 1004, including a first leg 1008a, a second leg 1008b, a third leg 1008c, and a fourth leg 1008d. Each of leg 1008 may include an indent radially and axially centered with one of deformable areas of case 1002. In some examples, each indent may be formed in substantially the same shape. In alternate examples, the indents may be formed as different shapes. In an exemplary embodiment shown in FIG. 10, first leg 1008a, second leg 1008b, and third leg 1008c may each include a conical indent 1010 while fourth leg 1008d includes a stepped indent 1012.

Conical indent 1010 may be similar to indent 510 of FIG. 5 and stepped indent 1012 may be similar to indent 602 of FIG. 6.

Further, in some embodiments each deformable area may be punched sequentially by a single punch. In an alternate embodiment, as shown in FIG. 10, each of the deformable areas 1006 may be punched simultaneously using punches 1014, where a quantity of punches is at least equal to a quantity of deformable areas 1006 of the case 1002. In this way, forces applied to IAD pre-assembly 1000 during punching may be evenly distributed. In the exemplary embodiment of IAD pre-assembly 1000, the case includes four deformable areas 1006 and may be punched using four punches 1014, including a first punch 1014a, a second punch 1014b, a third punch 1014c, and a fourth punch 1014d. In some examples, each punch 1014 may be formed in substantially the same shape. In an alternate embodiment shown in FIG. 10, first punch 1014a may be conically shaped and second punch 1014b, third punch 1014c, and fourth punch 1014d may each be stepped shape, including a centering portion. In this way first punch 1014a may be similar to punch 506 of FIG. 5 and second punch 1014b, third punch 1014c, and fourth punch 1014d may each be similar to punch 604 of FIG. 6.

In an exemplary embodiment, at least one of the stepped shape indent may be radially and axially aligned with a stepped shape punch. For example, fourth punch 1014d may be radially and axially aligned with stepped indent 1012. In this way, at least one punch/indent pair may include a centering portion and corresponding receiving indent adapted to center legs 1008 with respect to punches before a conical face of the punch begins to deform the deformable area.

Turning now to FIG. 11, a flowchart of an example of a method 1100 for forming an IAD assembly including protruded deformable areas is shown. Steps of method 1100 may be performed manually or may be automated as part of an assembly line for manufacturing IAD assemblies. Method 1100 may be performed after a spider is assembled. For example, before method 1100 starts any gears such as pinion gears which are positioned on the spider may be assembled and positioned circumferentially surrounding legs of the spider. At 1102, method 1100 includes positioning a spider with a case and aligning a deformable area of the case with an indent of the leg. The case may be a case of an IAD pre-assembly such as case 301 of FIG. 3 or case 1002 of FIG. 10. The spider may be similar to spider 204 of FIGS. 2-3 or spider 1004 of FIG. 10. Aligning the deformable area of the case with the indent of the leg may include radially and axially aligning the spider with the case, such that a radial center of the deformable area is aligned with a radial center of the indent.

At 1104, method 1100 includes punching the deformable area into the indent of the leg to form a protrusion. Punching may be performed by a punch such as punch 506 of FIG. 5 or punch 604 of FIG. 6. A tapered face of the punch may force the deformable area at least partially into the indent such that a protrusion extending at an angle away from an inner circumferential surface of the case is formed. In some examples, punching may include punching each deformable area of the case at the same time. In an alternate example, the deformable areas may be punched sequentially. During punching, the indent of the leg may perform the function of a die block and receive the indent and a portion of the pilot portion of the punch. At the conclusion of step 1104, the punch is removed from the case and the IAD assembly may be formed including the protrusion. The protrusion interfacing with the indent of the leg may prevent relative movement of the case and the spider.

At 1106, method 1100 may optionally include welding the protrusion to the leg. Welding may include plug welding or projection welding. Welding may further secure the case to the leg. In some examples, welding may be performed if the IAD assembly is expected to be subject to high stress.

At 1108, method 1100 includes installing the IAD assembly into a drivetrain of a vehicle. For example, a spline of the spider may be coupled to an input shaft of the vehicle. Method 1100 ends.

The technical effect of method 1100 is to secure a spider of an IAD assembly to a case of an IAD assembly using features that are integrated into the case. In this way, undesired movement of the case is prevented without adding additional weight to the IAD assembly. Further the case may be secured in a time efficient process with demanding the increased manual or complex labor of attaching fasteners.

The disclosure also provides support for an inter-axle differential (IAD) assembly, comprising: a case, and a spider disposed within the case, the spider having a plurality of outwardly extending legs, each leg comprising an indent at a distal face thereof, wherein the case comprises a plurality of protrusions adapted to be positioned within corresponding indents of the plurality of outwardly extending legs, the plurality of protrusions adapted to maintain a position of the case relative to the spider. In a first example of the system, a quantity of the plurality of outwardly extending legs is greater than a quantity of the plurality of protrusions. In a second example of the system, optionally including the first example, the plurality of protrusions comprises a first protrusion and a second protrusion, the second protrusion positioned axially 90° from the first protrusion around a circumference of the case. In a third example of the system, optionally including one or both of the first and second examples, one of plurality of protrusions comprises a pilot hole. In a fourth example of the system, optionally including one or more or each of the first through third examples, the indent is conically shaped. In a fifth example of the system, optionally including one or more or each of the first through fourth examples, the indent comprises a first portion having a first diameter and a second portion having a second diameter smaller than the first diameter, and a step transition between the first portion and the second portion. In a sixth example of the system, optionally including one or more or each of the first through fifth examples, the plurality of protrusions extend at an angle from an inner surface of the case. In a seventh example of the system, optionally including one or more or each of the first through sixth examples, walls of the indent are smooth.

The disclosure also provides support for an inter-axle differential (IAD) assembly, comprising: a case comprising an area formed continuously with the case comprising a protrusion extending towards an interior of the case, wherein the area is more deformable than remaining areas of the case that does not comprise the protrusion, and wherein a radial thickness of the case in the area comprising the protrusion is less than a radial thickness of the case in the remaining areas, and a spider comprising a ring portion and a leg extending from the ring portion, a distal face of the leg in face sharing contact with an inner circumferential surface of the case, and wherein the leg includes an indent adapted to mate with the protrusion. In a first example of the system, the area is integrally formed with the case. In a second example of the system, optionally including the first example, a cross section of the area is circular. In a third example of the system, optionally including one or both of the first and second examples, the indent includes a first circular portion extending from the distal face of the leg and a diameter of the area is at least equivalent to a diameter of the first circular portion. In a fourth example of the system, optionally including one or more or each of the first through third examples, the area comprises a pilot hole. In a fifth example of the system, optionally including one or more or each of the first through fourth examples, the protrusion extends towards the indent at an angle from the inner circumferential surface of the case.

The disclosure also provides support for a method, comprising: positioning a spider within a case of an inter-axle differential assembly, wherein positioning comprises radially and axially aligning an indent of a leg of the spider with a deformable area of the case, punching the deformable area into the indent using a punch, wherein punching the deformable area forms a protrusion adapted to prevent relative movement of the spider and the case. In a first example of the method, the deformable area is in line with an inner circumferential surface of the case and an inner diameter of the case is uniform prior to punching. In a second example of the method, optionally including the first example, the punch includes a centering portion and the indent comprises a portion adapted to receive the centering portion of the punch. In a third example of the method, optionally including one or both of the first and second examples, a diameter of the portion of the indent adapted to receive the centering portion of the punch is smaller than a diameter of a portion of the indent adapted to mate with the protrusion. In a fourth example of the method, optionally including one or more or each of the first through third examples, the method further comprises: one of plug welding or projection welding the protrusion to the leg of the spider after punching. In a fifth example of the method, optionally including one or more or each of the first through fourth examples, the indent is adapted to be a die block of the punch.

FIGS. 2-3 and 5-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. FIGS. 2-10 are shown approximately to scale, however, other dimensions may be used if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An inter-axle differential (IAD) assembly, comprising:
a case; and
a spider disposed within the case, the spider having a plurality of outwardly extending legs, each leg comprising an indent at a distal face thereof, wherein the case comprises a plurality of protrusions adapted to be positioned within corresponding indents of the plurality of outwardly extending legs, the plurality of protrusions adapted to maintain a position of the case relative to the spider;
wherein the indent comprises a first portion having a first diameter and a second portion having a second diameter smaller than the first diameter, and a step transition between the first portion and the second portion.

2. The IAD assembly of claim 1, wherein a quantity of the plurality of outwardly extending legs is greater than a quantity of the plurality of protrusions.

3. The IAD assembly of claim 2, wherein the plurality of protrusions comprises a first protrusion and a second protrusion, the second protrusion positioned axially 90° from the first protrusion around a circumference of the case.

4. The IAD assembly of claim 1, wherein one of plurality of protrusions comprises a pilot hole.

5. The IAD assembly of claim 1, wherein the indent is conically shaped.

6. The IAD assembly of claim 1, wherein the plurality of protrusions extend at an angle from an inner surface of the case.

7. The IAD assembly of claim 1, wherein walls of the indent are smooth.

8. An inter-axle differential (IAD) assembly, comprising:
a case comprising an area formed continuously with the case comprising a protrusion extending towards an interior of the case, wherein the area is more deformable than remaining areas of the case that does not comprise the protrusion, and wherein a radial thickness of the case in the area comprising the protrusion is less than a radial thickness of the case in the remaining areas; and a spider comprising a ring portion and a leg extending from the ring portion, a distal face of the leg in face sharing contact with an inner circumferential surface of the case, and wherein the leg includes an indent adapted to mate with the protrusion.

9. The IAD assembly of claim 8, wherein the area is integrally formed with the case.

10. The IAD assembly of claim 8, wherein a cross section of the area is circular.

11. The IAD assembly of claim 8, wherein the indent includes a first circular portion extending from the distal face of the leg and a diameter of the area is at least equivalent to a diameter of the first circular portion.

12. The IAD assembly of claim 8, wherein the area comprises a pilot hole.

13. The IAD assembly of claim 8, wherein the protrusion extends towards the indent at an angle from the inner circumferential surface of the case.

14. A method, comprising:
positioning a spider within a case of an inter-axle differential assembly, wherein positioning comprises radially and axially aligning an indent of a leg of the spider with a deformable area of the case;
punching the deformable area into the indent using a punch, wherein punching the deformable area forms a protrusion adapted to prevent relative movement of the spider and the case.

15. The method of claim 14, wherein the deformable area is in line with an inner circumferential surface of the case and an inner diameter of the case is uniform prior to punching.

16. The method of claim 14, wherein the punch includes a centering portion and the indent comprises a portion adapted to receive the centering portion of the punch.

17. The method of claim 16, wherein a diameter of the portion of the indent adapted to receive the centering portion of the punch is smaller than a diameter of a portion of the indent adapted to mate with the protrusion.

18. The method of claim 14, further comprising one of plug welding or projection welding the protrusion to the leg of the spider after punching.

19. The method of claim 14, wherein the indent is adapted to be a die block of the punch.

\* \* \* \* \*